US006768097B1

(12) United States Patent
Viktorovitch et al.

(10) Patent No.: US 6,768,097 B1
(45) Date of Patent: Jul. 27, 2004

(54) OPTOELECTRONIC DEVICE WITH WAVELENGTH FILTERING BY CAVITY COUPLING

(75) Inventors: Pierre Viktorovitch, Tassin la Demi-Lune (FR); Michel Garrigues, La Tour de Salvagny (FR); Jean-Louis Leclercq, Morance (FR)

(73) Assignees: Centre National de la Recherche Scientifique, Paris (FR); Ecole Centrale de Lyon, Ecully Cedex (FR)

( * ) Notice: Subject to any disclaimer, the term of this patent is extended or adjusted under 35 U.S.C. 154(b) by 0 days.

(21) Appl. No.: 10/635,713

(22) Filed: Aug. 5, 2003

Related U.S. Application Data

(63) Continuation of application No. PCT/FR02/00402, filed on Feb. 1, 2002.

(30) Foreign Application Priority Data

Feb. 5, 2001 (FR) .............................................. 01 01520

(51) Int. Cl.$^7$ ................................................ G01J 3/50
(52) U.S. Cl. ................................. 250/226; 250/227.28
(58) Field of Search ................................. 250/226, 216, 250/227.28; 333/227, 230; 372/22, 23; 324/305, 312, 313, 314

(56) References Cited

U.S. PATENT DOCUMENTS

| 5,103,340 | A | 4/1992 | Dono et al. | |
| 5,225,930 | A | 7/1993 | Land et al. | |
| 6,518,857 | B1 * | 2/2003 | Hattori et al. | ............... 333/134 |

FOREIGN PATENT DOCUMENTS

| EP | 0903615 A2 | 3/1999 |
| WO | WO 98/17968 | 4/1998 |

OTHER PUBLICATIONS

Lamperski, Jan, "Discretely Tunable Multi Cavity FFP Filter for Standard WDM Frequency Grid," 2000 Electronic Components and Technology Conference, Las Vegas, Nevada, May 21–24, 2000, pp. 1572–1575, XP–002178773, Piscataway, NJ, USA.

Saleh, A.A.M. and Stone, J., "Two–Stage Fabry–Perot Filters as Demultiplexers in Optical FDMA LAN's," Journal of Lightwave Technology, Feb. 1989, pp. 323–330, vol. 7, No. 2, XP 000006106, New York, USA.

Spisser, A., et al., "Highly Selective and Widely Tunable 1.55–MUM InP/Air–Gap Micromachined Fabry–Perot Filter for Optical Communications," IEEE Photonics Technology Letters, Sep. 1998, pp. 1259–1261, vol. 10, No. 9, XP–000783228, New York, USA.

(List continued on next page.)

*Primary Examiner*—Que T. Le
(74) *Attorney, Agent, or Firm*—Alston & Bird LLP

(57) ABSTRACT

The invention is an optoelectronic device comprising first means defining a first thick resonant cavity having a multiple transmission resonant modes, second means defining a second thin resonant cavity having one transmission resonant mode, means for optically coupling the first and second means, and electrostatic means designed to apply to the second means an electric voltage selected to vary the thickness of the second cavity and the special position of its resonant mode, such that it coincides with one of the resonant modes of the first cavity.

19 Claims, 2 Drawing Sheets

OTHER PUBLICATIONS

Jain, Anil, et al., "Dual Tunable Fabry–Perot Spectrally Agile Filter," Optical Engineering, Mar./Apr. 1984, pp. 159–166, vol. 23, No. 2, XP–000997092, Minneapolis, MN.

Gunning, William, "Double–cavity electrooptic Fabry–Perot tunable filter," Applied Optics, Sep. 1, 1982, pp. 3129–3131, vol. 21, No. 17, XP–000997094, Thousand Oaks, CA.

Wu, M.S. etc., "Widely tunable 1.5 μm micromechanical optical filter using A10x/A1GaAs DBR," Electronics Letters, Sep. 25, 1997, pp. 1702–1704, vol. 33, No. 20, U.S.A.

Tayebati, P., etc., "Microelectromechanical tuneable filters with 0.47 nm linewidth and 70 nm tuning range," Electronics Letters, Jan. 8, 1998, pp. 76–77, vol. 34, No. 1, U.S.A.

Tayebati, P., etc., "Widely tunable Fabry–Perot Filter Using Ga(Al)As–A10$_x$ Deformable Mirrors," IEEE Photonics Technology Letters, Mar. 1998, pp. 394–396, vol. 10, No. 3, U.S.A.

Tayebati, P., etc., "Microelectromechanical tunable filter with stable half symmetric cavity," Electronics Letters, Oct. 1, 1998, pp. 1967–1968, vol. 34, No. 20, U.S.A.

Rondi, D., etc., "Highly selective 1.55 μm InP/air gap micromachined Fabry–Perot filter for optical communications," Electronics Letters, Mar. 15, 1998, pp. 453–455, vol. 34, No. 5, U.S.A.

International Search Report from corresponding International Application No. PCT/FR02/00402, dated Jan. 24, 2003.

* cited by examiner

OPTOELECTRONIC DEVICE WITH WAVELENGTH FILTERING BY CAVITY COUPLING

CROSS-REFERENCE TO RELATED APPLICATIONS

This is a continuation application of PCT/FR02/00402, filed Feb. 1, 2002, which is incorporated herein by reference in its entirety, and also claims the benefit of France Priority Application No. 01/01520, filed Feb. 5, 2001.

FIELD OF THE INVENTION

The invention relates to the field of selective optical filtering by electrical modulation of the spectral transfer function.

It relates more particularly, although not exclusively, to electrically tunable optoelectronic filter devices intended for the wavelength demultiplexing of the channels of certain optical telecommunication installations, and especially installations using multiplexing systems known as WDM (Wavelength Division Multiplexing) and DWDM (Dense Wavelength Division Multiplexing).

BACKGROUND OF THE INVENTION

To provide this type of demultiplexing, Fabry-Pérot type filters have been proposed that include a resonant air cavity placed between partial reflectors. The wavelength tunability of these filters is obtained by displacing at least one of the partial reflectors, which is mounted in an elastic manner, under the effect of an electrostatic pressure.

Devices of this type have been described, for example, in the scientific articles mentioned below:

M. S. Wu, G. S. Yuen and C. J. Chang-Hasnain, "*Widely tunable 1.5 μm micromechanical optical filter using AlOx/AlGaAs DBR*", Electronics Letters 33, 1702 (1997);
P. Tayebati, P. Wang, D. Vakhshoori and R. N. Sacks, "*Microelectromechanical tunable filters with 0.47 nm linewidth and 70 nm tuning range*", Electronics Letters 34, 76 (1998), and "*Widely tunable Fabry-Perot filter using Ga(Al)As-AlOx deformable mirrors*", IEE Photonics Technology Letters 10, 394 (1998);
P. Tayebati, P. Wang, A. Azimi, L. Maflah and D Vahshoori, "*Microelectromechanical tunable filters with stable half symmetric cavity*", Electronics Letters 34, 1967 (1998);
D. Rondi, R. Blondeau, G. Guillot and P. Viktorovitch, "*Highly selective 1.55 μm InP/Air-gap micromachined Fabry-Perot Filter For Optical Communications*", Electronics Letters 39, 453 (1998); and
A. Spisser, R. Ledantec, C. Seassal, J. L. Leclercq, T. Benyattou, D. Rondi, R. Blondeau, G. Guillot and P. Viktorovitch, "*Highly selective and widely tunable 1.55 μa InP/Air-gap micromachined Fabry-Perot Filter For Optical Communications*", IEEE Photonics Technology Letters, 10 (9), 1259 (1998).

However, these devices having a single resonant cavity cannot provide simultaneously, for theoretical reasons, suitable separation (typically greater than −20 dB) between adjacent channels and a useful passband sufficient for transmission, without attenuation, of a rapid modulation (typically greater than 10 GHz) of the light signal.

It is known that suitable filters, that is to say those possessing a more "rectangular" passband, are obtained using several Fabry-Pérot cavities coupled together. A filter having two coupled cavities makes it possible, for example, to meet the specifications of the current WDM systems for a given wavelength. Solutions have already been proposed for achieving tunability of filters having two coupled cavities.

Thus, document U.S. Pat. No. 5,103,340 proposes the coupling of two resonant air cavities, called "thick" cavities because they have optical thicknesses of $m\lambda/2$ and $n\lambda/2$, m and n being integers of around 100 and close enough to have spaced-apart common resonance wavelengths. The thickness of each cavity is controlled here by a common piezoelectric actuator placed so that the displacements of the two cavities are proportional to the integers m and n. However, it is quite difficult to tune the two cavities simultaneously and the overall size of these devices is an obstacle to a high level of integration. In addition, these devices require high control voltages, typically of the order of a few hundred volts, which make them difficult, or even impossible, to use in environments in which the energy consumption levels are low.

SUMMARY OF THE INVENTION

The object of the invention is to remedy all or some of the aforementioned drawbacks.

For this purpose, the invention provides an optoelectronic device comprising i) first means that define a first (thick) resonant cavity, the thickness and the composition of which are chosen to offer a multiplicity of resonant transmission modes in a chosen wavelength range, and ii) second means that define a second (thin) resonant cavity, the thickness and the composition of which are chosen to offer a single resonant transmission mode in the chosen wavelength range, the device being characterized in that it also includes means for optically coupling said first and second means, and electrostatic means able to apply an electrical voltage to said second means, said electrical voltage making it possible to vary the thickness of the second cavity and the spectral position of the associated resonant mode so that this mode coincides with any one of the resonant modes of the first cavity (said mode being chosen from all those that it has). The device may thus transmit an incident light wave whose wavelength is that of a resonant mode common to the thin and thick cavities.

In the device according to the, invention, it is sufficient to tune the second cavity to a resonant mode that coincides with a resonant mode of the first cavity, which is much simpler than tuning both cavities simultaneously and can be carried out with simple means. The optical coupling of the two cavities allows transmission of really "rectangular" signals, in accordance with the standards of the WDM and DWDM systems.

The expression "optical coupling means" is understood here to mean a means allowing optical interaction between the thin and thick cavities. Furthermore, "any one" is understood to mean the fact of selecting, according to the requirements, one or other mode of the first cavity by controlling the thickness of the second cavity. In other words, any one of the modes of the first cavity may be chosen, depending on the requirements.

Thus, the two, thin and thick, coupled cavities produce a filter whose transmission wavelength may be adjusted in a discontinuous manner over each (or at least a certain number) of the wavelengths of the various transmission modes of the thick cavity. The spectral characteristic of the transmission function thus produced is that of a filter having two coupled cavities, and therefore has rejection and passband characteristics that are greatly superior to those of a filter with a single cavity.

In one advantageous embodiment, the thickness and the composition of the first (thick) cavity are chosen so that the multiplicity of its resonant transmission modes defines a comb, the position of the modes and the distance between adjacent modes (or intermode spacing) of which are chosen so as to coincide respectively with the position and distance of the wavelengths of the light signal that it is desired to demultiplex, such as those that are defined by the international standards (such as the ITU).

Preferably, the first means that define the first (thick) cavity comprise two approximately parallel partial reflectors spaced apart by a first layer of material (preferably semiconductor material), the thickness of which fixes the position of the resonant modes of the first cavity, and which ensure the resonance of this first cavity.

Also preferably, the second means that define the second (thin) cavity comprise at least two approximately parallel partial reflectors spaced apart by a second layer of material (preferably an air layer), the thickness of which defines the position of the resonant mode of the second cavity, and which ensure the resonance of this second cavity.

According to another feature of the invention, the electrostatic means are produced by electrically connecting each of the two partial mirrors of the second means to a first electrode and a second electrode in such a way that, when a potential difference is applied between said first and second electrodes, the thickness of the air cavity located between the two partial reflectors (or mirrors) changes. In one particular embodiment, the second means are configured so as to define at least one substructure of the pin or nip junction type. In this case, the pin junction, or alternatively the nip junction, is reverse-biased by the electrostatic means.

Advantageously, the partial reflectors are Bragg reflectors consisting of at least one quarter-wave-type alternation of two materials having different refractive indices. These alternations may relate, for example, to silicon and silicon dioxide layers and/or air and semiconductor layers (as described in the articles by Spisser et al. cited in the introduction).

Advantageously, the first and second means are composed of semiconductor materials, and preferably materials of the III–V type, such as gallium arsenide (GaAs), InGaAs or indium phosphide (InP). This makes it possible to use epitaxy and selective etching techniques, especially when the second (thin) layer is an air layer and/or the reflectors that surround it are Bragg-type reflectors formed by alternations of semiconductor layers and air layers (the air optionally being replaced with another fluid material—a gas or liquid—or a polymer).

In one advantageous embodiment, the means for coupling the thin and thick cavities are third means (for example a layer of material or an air layer) that are interposed between the first and second means (and especially between two reflectors) and having dimensions chosen so as to ensure optimum optical coupling between the first and second cavities. According to the principles of producing Fabry-Pérot cavity filters well known to those skilled in the art (see, for example, H. A. Macleod, "Thin-film optical filters", New York, McGraw-Hill, 1986), the coupling means may be formed, for example, by a layer of the quarter-wave type.

The device may also include means for shifting the frequency of the multiplicity of resonant transmission modes of the first means. Preferably, the frequency shift is obtained by a controlled variation of the temperature of the first means (at least).

BRIEF DESCRIPTION OF THE DRAWINGS

Other features and advantages of the invention will become apparent on examining the detailed description below and from the appended drawings in which.

Figure 1:
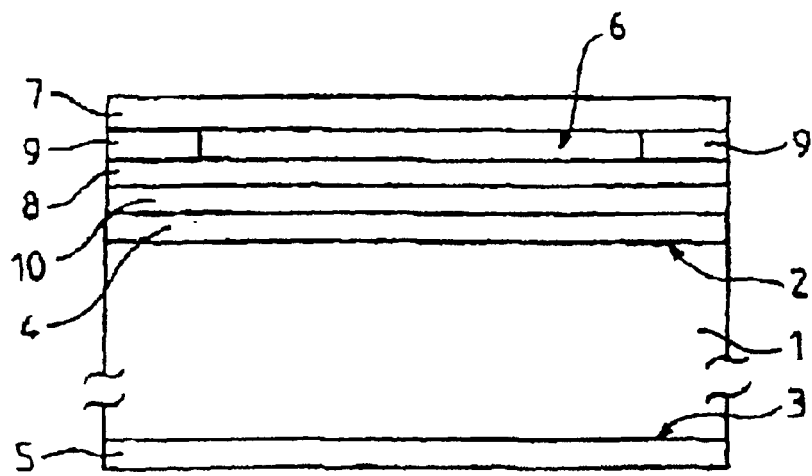
FIG. 1 is a schematic cross-sectional view of a first embodiment of a filter device according to the invention.

The appended drawings are, for the most part, of a defining character. Consequently, they may not only serve to supplement the invention, but also contribute to its definition, where appropriate.

DETAILED DESCRIPTION OF THE PREFERRED EMBODIMENTS

A first embodiment of a filter device according to the invention, intended for the optical processing of an external light, will firstly be described with reference to FIG. 1.

In the example illustrated, the device comprises a thick first resonant cavity 1 produced in the form of a layer of material, preferably semiconductor material. This layer, that defines the first resonant cavity 1, has two approximately parallel end faces termed here the "upper face" 2 and the "lower face" 3. The upper face 2 is bonded to a partial reflector (or mirror) 4, which will be termed the "upper mirror", whereas the lower face 3 is bonded to a partial reflector (or mirror) 5, which will be termed the "lower mirror".

These two mirrors, the upper mirror 4 and the lower mirror 5, are called partial mirrors as they allow resonant transmission modes to be obtained in the thick first cavity 1.

The first cavity 1 is called "thick" as it has a multiplicity of resonant transmission modes spaced regularly apart, defining a comb of constant intermode spacing.

The number of resonant transmission modes, and the spacing between these modes, depends directly on the thickness of the first cavity 1 and on the material of which it is formed.

In a thick resonant cavity, the frequency spacing $\Delta f$ is related to the speed of light in vacuum (c) and to the optical thickness (x) of the thick cavity through the equation: $\Delta f = c/2x$.

Thus, if it is desired to obtain an intermode spacing of 200 GHz, it is necessary to provide a thick cavity whose optical thickness x is 750 micrometers ($\mu$m) in vacuum (x=c/2× $200 \times 10^9$)

For example, if the thick first cavity 1 is made in a semiconductor layer such as indium phosphide (InP), the refractive index of which is about 3.15 around a wavelength of 1.5 $\mu$m, the effective thickness of the cavity must therefore be equal to 238 (i.e. 750/3.15) $\mu$m. Such a thickness advantageously corresponds to the normal thickness of a semiconductor substrate as may be found commercially.

The device according to the invention also includes a second, thin, resonant cavity 6 flanked by two partial reflectors (or mirrors) that will be termed here the "upper mirror" 7 and the "lower mirror" 8.

In the example illustrated in FIG. 1, the second cavity 6 is preferably hollowed out and filled with an air layer. The thickness of the thin second cavity 6 is set by the thickness of spacers 9 interposed between the upper mirror 7 and the lower mirror 8. The thickness of the air layer is equal to $k\lambda/2$, k preferably being an integer equal to 1, 2 or 3 and $\lambda$ being the desired central wavelength of the resonant transmission mode of this thin cavity.

The air layer could be replaced with a layer of any other material having mechanical properties suitable for withstanding a large deformation without introducing substantial stresses (partial vacuum, or gaseous, liquid or gelled materials for example).

The partial mirrors 7 and 8 that flank the second cavity 6, together with the spacers 9, are preferably made from semiconductor materials. Because the upper mirror 7 is placed above a hollowed-out cavity, it constitutes what is called a "suspended" layer.

As will be seen later, the hollowed-out part that receives the air layer 6 is preferably produced using a surface micromachining process for selectively removing a solid sacrificial layer separating the upper 7 and lower 8 mirrors and that constitutes, at the end of the process, the spacers 9.

The second cavity 6 is called "thin" as it possesses only a single resonant transmission mode, chosen of course within the working (incident light) wavelength range.

In order for the filter device according to the invention to be able, on command, to transmit an incident light wave whose wavelength corresponds to one of the resonant modes of the comb of the first cavity 1, the wavelength of the resonant transmission mode of the thin second cavity 6 must coincide with said resonant mode of said comb. To obtain such coincidence in any of the modes of the comb, the thickness of the thin second cavity 6 is electrically adjusted by means of ohmic contacts or electrodes (not shown) placed at chosen points on the device. These ohmic contacts are preferably made of an alloy of the AuGe or Pd—AuGe or Ti—Pt—Au type. They are intended to cause a potential difference between the upper 7 and lower 8 mirrors that flank the second cavity 6. They are consequently placed in contact with the layers that form the mirrors 7 and 8 or with the layers (7 and 5) placed at the two ends of the device, or on each layer, or else on the end layers and on certain intermediate layers.

This chosen potential difference between the upper (suspended) mirror 7 and the lower mirror 8 induces an electrostatic pressure that displaces said upper mirror 7 relative to the lower mirror 8, thus changing the thickness of the second cavity 8 and consequently changing the wavelength of its initial resonant transmission mode.

Of course, to obtain this relative displacement of one of the mirrors relative to the other, it is important for the suspended mirror that is displaced to be mounted in an elastic manner. The techniques used to achieve this result will be discussed later.

As mentioned above, the bias voltages for the mirrors 7 and 8 will define, at a given instant, the wavelength that can be transmitted by the filter device (and that coincides with one of the resonant transmission modes of the first resonant cavity 1).

The two coupled cavities 1, 6 thus produce a tunable filter whose transmission wavelength can be set in a discontinuous manner on each, or at least some, of the wavelengths of the resonant transmission modes set by the construction of the thick first resonant cavity 1.

When the materials that make up the mirrors 7 and 8 and the spacers 9 are semiconductors, the elastic deformation of a suspended layer may be obtained by at least one substructure of the pin or nip junction type in the device, especially so as to define the second resonant cavity 6. It consequently follows that the various semiconductor layers (and spacers), making up the partial mirrors 7 and 8 in the example, must have particular doping concentrations so that the substructure acts as a pin or nip junction well known to those skilled in the art.

When the device according to the invention provides only one filtering function, a single pin- or nip-type substructure flanking the second cavity 6 is necessary. In this case, all the components of the upper partial mirror 7 are p- or n-type doped, whereas all the constituents of the lower partial mirror 8 are n- or p-type doped, depending on whether the structure is of the pin or nip type, and the spacers 9 are made in unintentionally doped semiconductor materials, that is to say of the i type. In the absence of bias, the upper partial mirror 7 is in a rest (or equilibrium) position. On the other hand, when the pin junction (formed by the upper mirror 7 and lower mirror 8) is reverse-biased, the upper mirror 7 is attracted by the lower mirror 8 over a chosen distance that depends on the potentials applied to the layers and on the characteristics of the cavities.

The partial mirrors of the thick first cavity 1 and of the thin second cavity 6 may be of identical or different types. However, they are preferably made in the form of Bragg reflectors (or mirrors) consisting of one or more quarter-wave alternations of layers of the silicon (Si) layer/silicon dioxide ($SiO_2$) layer or semiconductor material (for example InP) layer/air layer type or of alternations of layers of two different semiconductors having sufficient index differences.

The filter device according to the invention may, as illustrated in FIG. 1, include a coupling layer 10 for ensuring optical coupling between the first 1 and second 6 resonant cavities. Preferably, this coupling layer 10 is placed between the lower mirror 8 of the thin second cavity 6 and the upper mirror 4 of the thick first cavity 1. Its function is to provide optical coupling such that the two cavities interact so as to exhibit the desired spectral characteristic. According to the principles known to those skilled in the art, the optical thickness of this layer 10 may be equal to an odd multiple of a quarter of the working wavelength. Preferably, it consists of one of the materials making up the mirrors 4 or 8 or of an alternation of these materials.

To produce a device of the type illustrated in FIG. 1, various deposition or epitaxy techniques may be envisioned, provided that they allow suitable control of the thicknesses of the layers. Mention may be made, for example, of MBE (Molecular Beam Epitaxy) or LP-MOCVD (Low-Pressure Metal Organic Chemical Vapor Deposition) or CBE (Chemical Beam Epitaxy).

Such techniques allow extremely precise control of the thicknesses and, in addition, ensure excellent crystal qualities and very sharp interfaces. Moreover, they offer very precise control of the composition and of the doping. Finally, they allow excellent control of the residual mechanical stresses.

One of the epitaxy techniques must be combined with a chemical etching technique in order to remove part of the sacrificial layers that will be replaced with air layers. To do this, there are many chemical, especially wet chemical, etching techniques. They allow selective micromachining of the suspended parts (layer). As examples, mention may be made of the wet etching techniques of the $FeCl_3/H_2O$ or $HF/H_2O_2/H_2O$ type for the InGaAs/InP system, or else of the $HCl/H_2O$ or $HCl/H_3PO_4$ type for the InAlAs/InGaAlAs and GaInP/GaAs systems, or else of the HF type for the AlAs/GaAs system.

A second embodiment of a filter device according to the invention will now be described with reference to FIG. 2.

Figure 2:
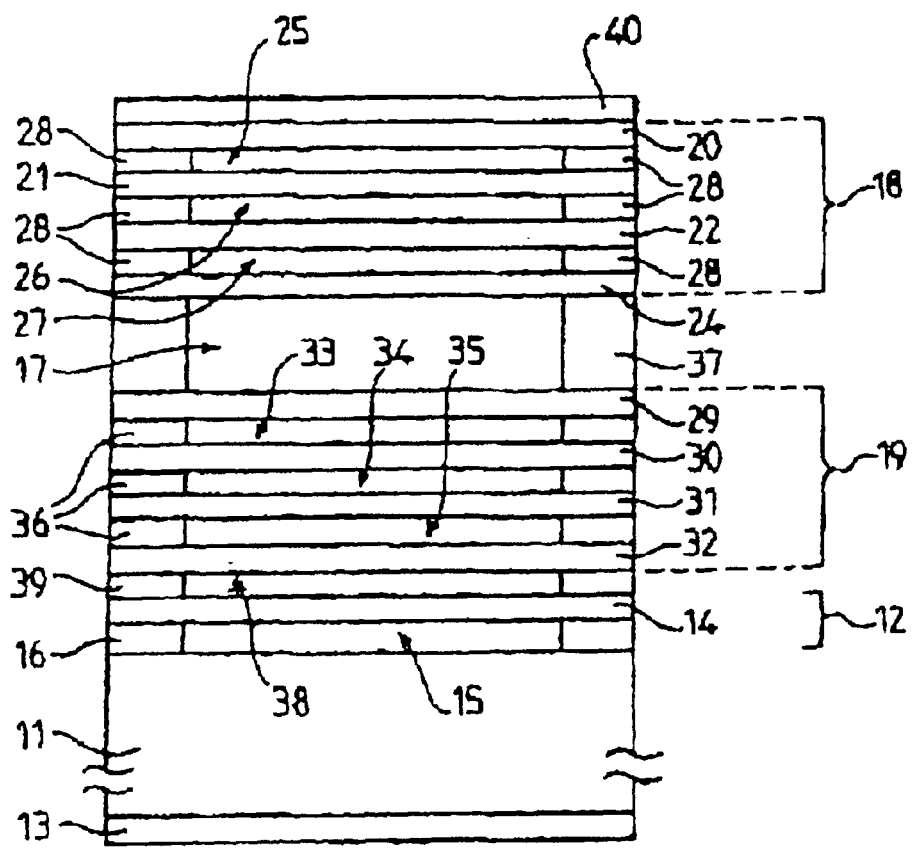
FIG. 2 is a schematic cross-sectional view of a second embodiment of a filter device according to the invention.

Just as in the case of the first embodiment illustrated in FIG. 1, the device illustrated in FIG. 2 includes a thick first cavity 11 coupled to a thin second cavity 17. The thick first cavity 11 here consists of a layer of material flanked by an upper partial reflector (or mirror) 12 and a lower partial reflector (or mirror) 13.

In FIGS. 1 and 2, the scales used to indicate the vertical and horizontal dimensions of the various layers are not the same.

In the example illustrated, the lower mirror 13 consists of an alternation of silicon/silicon dioxide ($Si/SiO_2$) type layers forming a lower Bragg mirror, while the upper mirror 12 consists of (at least) one alternation of a layer 14, preferably a semiconductor layer, and of an air layer 15, also forming a Bragg reflector (or mirror). The thickness of the air layer 15 is set by the thickness of spacers 16, these preferably being made of a semiconductor material and allowing the layer defining the thick first cavity 11 to be bonded to the semiconductor layer 14 of the upper mirror 12.

In this example, the thin second cavity 17 consists of an air layer flanked by an upper partial mirror 18 and a lower partial mirror 19 joined via spacers 37. The thickness of the spacers 37 therefore sets the optical thickness of the second cavity 17, i.e. $k\lambda/2$.

The upper partial mirror 18 here is in the form of a Bragg reflector (or mirror) comprising alternations of layers, preferably semiconductor layers, and air layers. More precisely, in the example illustrated, the upper partial mirror 18 comprises four semiconductor layers 20–24 separated from one another by three air layers 25–27, the thicknesses of the air layers being set by the respective thicknesses of spacers 28, also preferably made of a semiconductor material.

Of course, the number of semiconductor layers and air layers constituting the upper partial mirror 18 may be different from that mentioned above. The air layers may also be replaced with any other material having mechanical properties suitable for withstanding a large deformation without introducing substantial stresses (for example, gaseous liquid or gelled materials).

In the example illustrated in FIG. 2, the lower mirror 19 of the second cavity 17 is substantially identical to the upper mirror 18 of this same cavity. It consequently comprises four, preferably semiconductor, layers 29–32 separated from one another by three air layers 33–35 via spacers 36, also preferably made of a semiconductor material.

The thickness and the composition of the various semiconductor layers (20–24, 29–32 and 14) and of the various air layers (25–27, 33–35 and 15) of the Bragg mirrors are chosen so as to ensure optical properties suitable for the resonant structure and optimum mechanical properties for the semiconductor layers that constitute suspended layers, subjected to electrostatic pressures by the ohmic contacts described above.

More precisely, the semiconductor layers (20–24, 29–32 and 14) of the Bragg mirrors have an optical thickness equal to $(2k+1)\lambda/4$, where the constant k is an integer chosen according to the required stiffness. The air layers (25–27, 33–35 and 15) have an optical thickness equal to $(2k+1)\lambda/4$.

Preferably, and as illustrated in FIG. 2, the coupling between the thick first cavity 11 and the thin second cavity 17 is achieved using an intermediate layer 38, here made in the form of an air layer. Consequently, in this example, the end semiconductor layer 32 of the lower mirror 19 is joined to the layer 14 of the upper mirror 12 of the first cavity 11 via spacers 39, preferably made from a semiconductor material.

Moreover, and again as illustrated in FIG. 2, an additional filter 40 may be provided "above" the upper partial mirror 18 of the second cavity 17, said additional filter 40 consisting, for example, of a succession of silicon/silicon dioxide ($Si/SiO_2$) layers deposited after the epitaxy of the rest of the structure. This additional filter may be used for finely optimizing the optical transfer function of the device.

The production of a device of the type illustrated in FIG. 2 initially starts with a substrate, for example made of InP, which defines the thick first cavity, and then the various semiconductor layers (that will finally constitute the layers of the mirrors and the spacers), for example made of InP and InGaAs, are grown by epitaxy. Next, the lower partial mirror 13, and optionally the additional filter 40, are produced, when these are produced differently from the other mirrors, for example by the deposition of $Si/SiO_2$-type alternations. A lateral delimitation is then made by vertical etching, which defines the dimensions and the lateral shape of the various layers of the device, and then a sacrificial etching of the InGaAs layers is carried out, which does not affect the InP layers, in order to define the spacers.

In the example illustrated, the substrate is n-doped, or alternatively p-doped, and all the layers of the upper partial mirror 18 and all the spacers 28 are p-doped, alternatively n-doped, whereas all the layers 14 and 29–32 and all the spacers 16, 36 and 39 constituting the lower partial mirror 19, the partial mirror 12 and the coupling layer 10 are n-doped, or alternatively p-doped, the spacer 37 that sets the thickness of the thin cavity 17 being unintentionally doped (that is to say i-type doped) so as to form a pin, or alternatively nip, substructure around the thin second cavity 17.

Of course, the device may include other pin or nip substructures as described later.

As indicated with reference to FIG. 2, by reverse-biasing a pin substructure it is possible to obtain a controlled vertical displacement of one or more of its suspended layers 20–24 and 29–32 by electrostatic means. More precisely, owing to the effect of the bias of the various layers, the electric field that is set up between two adjacent layers defining the thin second resonant cavity 17 induces an electrostatic force that brings these two layers closer together, thus reducing the wavelength of the resonant transmission mode of this cavity 17.

Different and possibly more complex modulations of the transfer function of the device according to the invention may be obtained by modifying the type of doping of the various semiconductor layers or by intentionally inserting other layers of material, in order to constitute other pin- or nip-type substructures. For example, and with reference to FIG. 2 and to the aforementioned doping cases, it is possible to modify the doping of the layers 24 and 29 that define the thin resonant cavity 17 by n-doping, or alternatively p-doping, the layer 24 and p-doping, or alternatively n-doping, the layer 29. The spacer 28 between the layers 24 and 22 and the spacer 36 between the layers 29 and 30 are also left with no intentional doping. A series stack of three diode substructures—pin/nip/pin or alternatively nip/pin/nip—from the top down is thus produced in the device.

By positively, or alternatively negatively, biasing the upper electrode with respect to the lower electrode, the two pin, or alternatively nip, substructures are forward-biased and the nip, or alternatively pin, substructure is reverse-biased, thereby making it possible to apply the electrostatic field between the two adjacent layers 29 and 24 that define the thin cavity 17 in order to bring the two layers closer together and reduce the wavelength of the resonant transmission mode. Conversely, by negatively, or alternatively positively, biasing the upper electrode with respect to the lower electrode, the two pin, or alternatively nip, substructures are reverse-biased and the nip, or alternatively pin, substructure is forward-biased. The electrostatic field is therefore applied both between the layers 22 and 24 and between the layers 29 and 30, which may thus be brought closer together with the effect of increasing the thickness of the thin cavity 17 and therefore increasing the wavelength of the resonant transmission mode of the device. This effect may be accentuated by making the layers 22 and 30 thicker than the layers 24 and 29.

Figure 3:
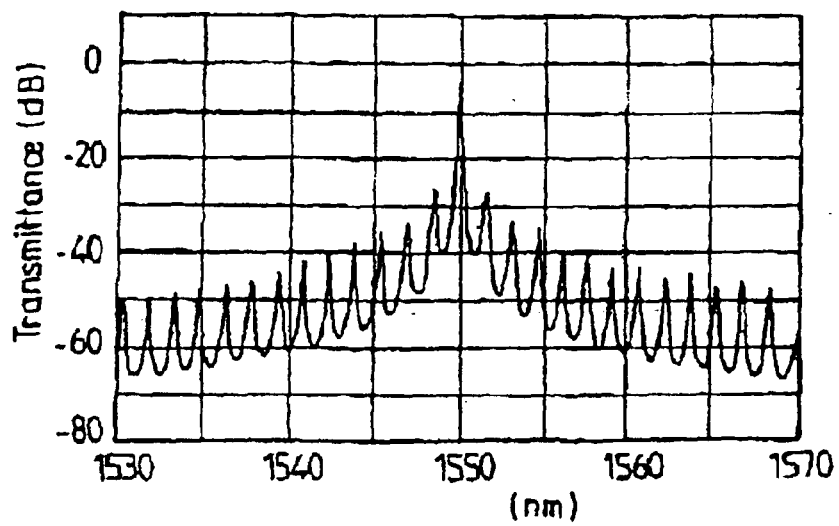
FIG. 3 is a graphical representation of the transfer function (transmittance) of the device shown in FIG. 2 as a function of the wavelength.
Figure 4:
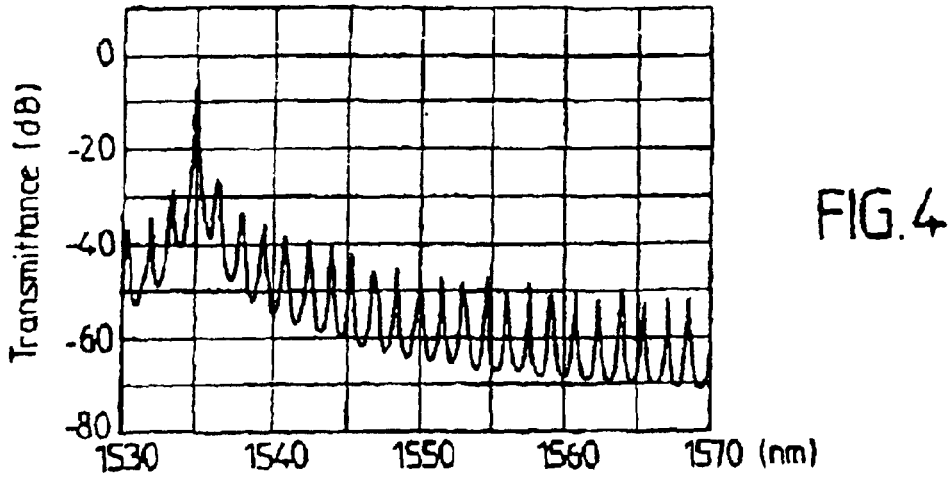
FIG. 4 is a graphical representation of the transfer function (transmittance) of the device shown in FIG. 2, after reducing the thickness of its thin cavity, as a function of the wavelength.
Figure 5:
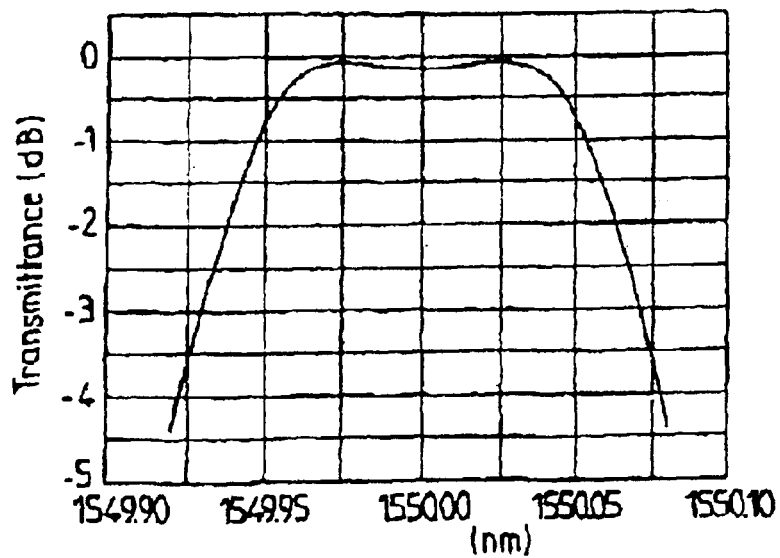
FIG. 5 is a graphical representation of the passband of the device shown in FIG. 2.

For the purpose of providing a practical illustration of the characteristics of the optical transfer function that is obtained with a device according to the invention, graphical representations of the spectral responses obtained with a filter device of the type illustrated in FIG. 2 are given in FIGS. 3 to 5. This transfer function corresponds to compositions and thicknesses that satisfy the formula indicated below:

$$O(3HL)*35H2L5H3L(3HL)*23HL1936HOSO$$

where H corresponds to a quarter-wave layer of InP, L corresponds to a quarter-wave layer of air, S corresponds to a quarter-wave layer of silicon (Si) and O corresponds to a quarter-wave layer of silicon dioxide ($SiO_2$)

Here, the reference wavelength is $\lambda_0=1550$ nanometers.

From the equation given above it follows that the thick first cavity 11 has a thickness of $484\lambda_0$, which corresponds to a transmission comb whose intermode spacing is 200 GHz.

As illustrated in FIG. 3, it may be seen that, at rest, that is to say without any variation in the thickness of the thin second cavity 17, the filter transmits only a single wavelength, here 1550 nm (nanometers), selected by the thin second cavity 17 from the multiplicity of resonant transmission modes of the thick first cavity 11 (spaced apart from one another by 200 GHz, i.e. about 1.6 nm). It may also be seen that the attenuation of the resonant modes adjacent to the selected mode is better than −20 dB.

Referring now to FIG. 4, which illustrates the spectral response of the filter after the thickness of its thin cavity 17 has been reduced electrostatically from the value $0.5\lambda_0$ to the value $0.4855\lambda_0$, it may be seen that the filter again selects only a single wavelength, here centered on the 1535 nm value, from among the multiplicity of resonant transmission modes of the thick first cavity 11.

FIG. 5 illustrates the passband of the aforementioned filter. As may be seen, this passband is 0.1 nm at more or less 1 dB, that is to say 12.5 GHz.

Of course, the number, the thickness and the nature of the various layers given above by way of example is absolutely not limiting. Once the principle of the invention is known, a person skilled in the art will be able to determine the optimum characteristics of a multilayer stack that meets the desired specifications, using the design and optimization techniques commonly used in the field of thin optical films.

The example presented above related to a comb with an intermode frequency spacing of 200 GHz. For substantially smaller intermode spacings, typically around 50 GHz, it would be preferred to use a structure of the type of those shown in FIGS. 1 and 2, coupled to a frequency shift module (not shown) designed to shift the frequencies of the comb of the thick first cavity 11 in a discrete manner. Preferably, the shift module is designed to vary the temperature of the device, and especially that of its thick cavity 11.

As an example, when the thick cavity is made of indium phosphide (InP), the effective wavelength of this cavity may be modified i) by thermal expansion, with a coefficient of $+5\times10^{-6}$/K and ii) by a variation in the refractive index with a $+5.5\times10^{-5}$/K coefficient, i.e. in total $6\times10^{-5}$/K. For a reference wavelength of 1550 nm, a total variation of 1.6 nm (200 GHz) corresponds approximately to $\frac{1}{1000}$ and consequently requires a change in temperature of about 16 kelvin (K). Consequently, to switch from one resonant mode to an adjacent mode 50 GHz away, the shift module must induce a temperature variation of around 4 kelvin.

The means allowing this temperature difference, and therefore a wavelength shift, to be obtained may advantageously be produced by bonding the optical filter device according to the invention to the thermal contact of a thermoelectric temperature regulation device, such as those commonly used and well known for stabilizing the temperature of light emitters of the semiconductor laser type.

Such a device may be combined with coupling means (for example optical fibers) for introducing the light to be treated and for collecting the treated light.

As indicated previously, the device according to the invention preferably comprises layers and spacers made of semiconductor materials, and more preferably semiconductor materials of the III–V type, such as for example qallium arsenide (GaAs), indium phosphide (InP) or InGaAs, or else heterostructures of the InGaAs/Inp or InAlAs/InGaAlAs type that are deposited on an InP substrate, or of the AlAs/GaAs type that are deposited on a GaAs substrate or else of the InGaP/GaAs type that are deposited on a GaAs substrate.

The III–V materials have very low, but above all controlled, residual mechanical stresses, ensuring that the suspended layers have a relatively high degree of flexibility that is essential for their electromechanical displacement.

The foregoing description related to illustrative examples in which the layers were made of semiconductor materials, because they were preferably obtained by epitaxy on a semiconductor substrate. However, other materials may be envisioned. As examples, mention may be made of crystalline silicon and polycrystalline silicon. Crystalline silicon structures may be obtained using SOI-type technologies by the etching of silica ($SiO_2$) layers, said technique being better known by the name "smart cut". More generally, any type of optical material may be envisioned.

Polycrystalline structures may be envisioned, but the flexibility of the layers is not very good because of the poor control of the mechanical stresses and the possible light adsorption that limit the filtering applications.

Of course, these materials constitute merely preferred examples.

Other functions may be envisioned for other embodiments of the device. As an example, mention may be made of wavelength switching and filtering functions being simultaneously provided in one and the same device, said functions being controlled by the bias voltages applied to the semiconductor layers.

The devices according to the invention offer many advantages insofar as they require low control voltages, typically around ten volts, and have small dimensions allowing them to be used in electronic components with a high level of integration, and especially for wavelength-demultiplexing the channels of certain optical telecommunication installations of the WDM or DWDM type.

However, many other applications may be envisioned, such as in the field of industrial control (for example in the agri-foodstuff industry) and of microspectrometry, especially in the environmental field (detection of gas transmission or absorption), or else in the field of medical analysis. In general, the device according to the invention is particularly suitable for optical signal processing.

The invention is not limited to the device embodiments described above merely by way of example; rather it encompasses any variant that a person skilled in the art may envision within the context of the appended claims.

What is claimed is:

1. An optoelectronic filter device, comprising:
   first means that define a first resonant cavity having a thickness and a composition that are chosen so as to exhibit a multiplicity of resonant transmission modes over a chosen wavelength range;
   second means that define a second resonant cavity having a thickness and a composition that are chosen so as to exhibit a single resonant transmission mode over said chosen range,
   means for optically coupling said first and second means; and
   electrostatic means designed to apply an electrical voltage to said second means, said electrical voltage being chosen so as to vary the thickness of the second cavity and the spectral position of the associated resonant mode so that it coincides with any one of the resonant modes of the first cavity in order to produce a filter having two optically coupled resonant cavities.

2. The device as claimed in claim 1, wherein the thickness and the composition of the first cavity are chosen so that said multiplicity of resonant transmission modes defines a comb of chosen intermode spacing.

3. The device as claimed in claim 1, wherein at least some of the first and second means are composed of semiconductor materials.

4. The device as claimed in claim 1, wherein the first means comprises two approximately parallel partial reflectors spaced apart by a first layer of material having a thickness that defines the position of the resonant modes of the first cavity and ensures the resonance of this first cavity.

5. The device as claimed in claim 4, wherein said first layer of material is a layer of semiconductor material having two approximately parallel faces bonded to said partial reflectors respectively.

6. The device as claimed claim 1, wherein the second means comprises at least two approximately parallel partial reflectors spaced apart by a second layer of material having a thickness that defines the position of the resonant mode of the second cavity and ensures the resonance of this second cavity.

7. The device as claimed in claim 6, wherein said second layer of material is a layer of air, the partial reflectors being spaced apart by spacers.

8. The device as claimed in claim 4, wherein said partial reflectors are Bragg reflectors consisting of quarter-wave-type alternations of two materials having different refractive indices.

9. The device as claimed in claim 8, wherein at least some of said Bragg reflectors consist of alternations of silicon layers and silicon oxide layers.

10. The device as claimed in claim 8, wherein at least some of said Bragg reflectors consist of at least one alternation of air layers and semiconductor layers, said semiconductor layers being separated from one another by semiconductors spacers.

11. The device as claimed in, claim 1, wherein the optical coupling means comprises third means interposed between the first and second means and having dimensions chosen so as to ensure optical coupling between said first and second cavities.

12. The device as claimed in claim 11, wherein said third means comprises a layer of material placed between two reflectors belonging to the first means and to the second means respectively.

13. The device as claimed in claim 12, wherein said third means comprises a layer of air placed between two reflectors belonging to the first means and to the second means respectively, said reflectors being spaced apart by spacers.

14. The device as claimed in claim 4, wherein said electrostatic means comprises a first electrode and a second electrode, each in contact with a partial reflector of the first means and suitable for being placed at different potentials chosen so as to vary the thickness of the air cavity located between said partial reflectors.

15. The device as claimed in claim 14, wherein the second means defines at least one substructure of the pin or nip junction type, reverse-biased or forward-biased by said first and second electrodes respectively, one of the reflectors including semiconductor layers having an n-type doping, the other reflector including semiconductor layers having a p-type doping, and the spacers that define the second cavity being unintentionally i-type doped.

16. The device as claimed in claim 1, further comprising means for frequency-shifting the multiplicity of resonant transmission modes of the first means.

17. The device as claimed in claim 16, wherein the frequency shift means is designed to vary the temperature of at least said first means in a controlled manner.

18. The device as claimed in claim 3, wherein the semiconductor layers are made from III–V type materials, particularly gallium arsenide (GaAs) or indium phosphide (InP), and wherein the spacers are made from III–V type materials, particularly InGaAs.

19. The device as claimed in claim 3, wherein said semiconductor layers and said spacers are produced by epitaxy and selective etching techniques.

* * * * *